(12) United States Patent
Endo

(10) Patent No.: US 7,305,568 B2
(45) Date of Patent: Dec. 4, 2007

(54) BACKUP SYSTEM FOR MULTI-SOURCE AUDIO APPARATUS

(75) Inventor: Satoshi Endo, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 891 days.

(21) Appl. No.: 10/693,501

(22) Filed: Oct. 27, 2003

(65) Prior Publication Data

US 2004/0088064 A1  May 6, 2004

(30) Foreign Application Priority Data

Oct. 28, 2002  (JP) ............................. 2002-313001

(51) Int. Cl.
*G06F 1/00* (2006.01)
*G06F 11/30* (2006.01)

(52) U.S. Cl. ...................... 713/300; 713/323; 713/324; 713/340

(58) Field of Classification Search ................ 713/300, 713/323, 324, 340
See application file for complete search history.

(56) References Cited

U.S. PATENT DOCUMENTS

| 4,949,324 | A | * | 8/1990 | Arata | ........................ 369/30.69 |
| 5,469,565 | A | * | 11/1995 | Hibi | ............................... 714/2 |
| 5,930,816 | A | | 7/1999 | Fujita | |
| 6,452,491 | B1 | * | 9/2002 | Maier et al. | ................. 340/506 |
| 6,993,316 | B2 | * | 1/2006 | Marko et al. | ............. 455/343.1 |
| 2002/0027508 | A1 | * | 3/2002 | Baba | ....................... 340/693.2 |

FOREIGN PATENT DOCUMENTS

| EP | 0 392 895 | 10/1990 |
| EP | 0 608 624 | 8/1994 |
| JP | 3-100848 | 4/1991 |
| JP | 2533967 | 6/1996 |
| JP | 2002-152875 | 5/2002 |

OTHER PUBLICATIONS

Patent Abstract of Japan JP-A-10222431, Aug. 21, 1998.

* cited by examiner

*Primary Examiner*—James K. Trujillo
*Assistant Examiner*—Michael J. Brown
(74) *Attorney, Agent, or Firm*—Wenderoth, Lind & Ponack, L.L.P.

(57) ABSTRACT

In a backup system 310, 340, 350, or 360, a controller 300 controls operation of a multi-source audio apparatus MMSA. An operation status holder 310 holds operation status information Dbk of the multi-source audio apparatus MMSA. A non-volatile memory 340 stores the operation status information Dbk. A capacitor 360 as a power storage means stores part Pt of operating power. An operating power detector 350 (Sps) detects whether or not the operating power is being supplied. An operation status information write device 310 selectively writes the operation status information Dbk into the non-volatile memory 34 depending on whether or not the operating power is being supplied.

8 Claims, 5 Drawing Sheets

FIG. 2

| ADDRESS | UPPER (1 Byte) | LOWER (1 Byte) | |
|---|---|---|---|
| 0x000 | Check code (0xA5) | Check code (0xC6) | |
| 0x001 | Version data (0xA5) | Check sum (1 Byte) | |
| 0x002 | Backup data | Backup data | Start of Backup data |
| 0x003 | Backup data | Backup data | |
| ⋮ | ⋮ | ⋮ | ⋮ |
| 0x2FF | Backup data | Backup data | End of Backup data |

| ADDRESS | UPPER (1 Byte) | LOWER (1 Byte) | |
|---|---|---|---|
| 0x300 | Check code (0xA5) | Check code (0xC6) | |
| 0x301 | Version data (0xA5) | Check sum (1 Byte) | |
| 0x302 | Program | Program | Start of Program |
| 0x303 | Program | Program | |
| ⋮ | ⋮ | ⋮ | ⋮ |
| 0x2FF | Program | Program | End of Program |

F I G. 3

| BACKUP DATA Dbk ||| 
|---|---|---|
| DATA ITEM | SIZE | TYPE |
| ASP_DEF.H | 10 byte | Dbk_A<br>LAST VOLUME/SOUND QUALITY ARE Dbk_B |
| CD_DEF.H | 1000 byte | Dbk_A |
| MD_DEF.H | 100 byte | Dbk_A |
| TIME_DEF.H | 50 byte | Dbk_A |
| TUNER_DEF.H | 70 byte | Dbk_A<br>LAST VOLUME/RECEPTION FREQUENCY ARE Dbk_B |

TOTAL: 1230 byte

BACKUP SYSTEM FOR MULTI-SOURCE AUDIO APPARATUS

BACKGROUND OF THE INVENTION

1. Field of the Invention

The present invention relates to a backup system for a multi-source audio apparatus capable of selectively reproducing, according to a user's instruction, sound from audio signals received from a plurality of sound sources including an analog tuner. The backup system holds operation status information of the multi-source audio apparatus in the event of a shutoff of operating power due to a blackout or the like.

2. Description of the Background Art

In a multi-source audio apparatus adapted to reproduce sound from a plurality of types of audio signal sources including an analog tuner, if supply of operating power is cut off abruptly and unintentionally due to a blackout or the like, the operation will be stopped with no chance of storing the operation status at the time of cutoff. When the operation of the multi-source audio apparatus is restarted with restoration of power supply, a predetermined sequence called cold start is followed thoroughly to boot up the apparatus in its initial state. Examples of such an operation technique are disclosed in Japanese Patent Laid-Open Publication No. 2002-152875 and Japanese Patent Gazette No. 2533967.

In the above technique, it is not possible to restart the operation of the apparatus continuously from the status at the time at which the operation was stopped the last time. Moreover, it takes time before the user can use the multi-source audio apparatus MMSA fully comfortably by again carrying out a sequence of storing user-specific necessary information. This is therefore far from a user-friendly environment.

To improve the situation described above, backup processing is effective such that, in the event of an abrupt and unintentional shutoff of operating power, backup data for enabling restoration of the operation environment of the multi-source audio apparatus at the time of the shutoff is stored in a non-volatile memory. An electrically erasable programmable read-only memory (EEPROM) is used as such an on-volatile memory. The power required for the backup processing may be stored in a capacitor during operation of the multi-source audio apparatus.

To ensure complete backup of the operation status of a multi-source audio apparatus, a large-capacity EEPROM will be necessary for storing a large amount of data. In addition, a long write time will be required to store a large amount of backup data into a large-capacity EEPROM in the event of an unintentional and abrupt shutoff of operating power, and this will consume a large backup power. Thus, a large-capacitance backup capacitor is necessitated.

A large-capacitance backup capacitor is large in size and costly, and therefore is detrimental to the realization of a compact and low cost multi-source audio apparatus MMSA.

SUMMARY OF THE INVENTION

Therefore, an object of the present invention is to provide a low-cost, low-power and high-speed backup system in which in the event that supply of operating power to a multi-source audio apparatus is abruptly and unintentionally cut off, as in the case of a blackout, operation environment information existing at the time of such an event is stored, and once power supply is restored, the multi-source audio apparatus is swiftly returned to the original status.

A first aspect of the present invention is directed to a backup system, for use in a multi-source audio apparatus capable of selectively reproducing sound from audio signals received from a plurality of sound sources including an analog tuner according to a user's instruction, for holding operation status information of the multi-source audio apparatus when operating power is shut off, the backup system comprising: control means for controlling operation of the multi-source audio apparatus; operation status holding means for holding the operation status information of the multi-source audio apparatus; non-volatile memory means for storing the operation status information; power storage means for storing part of the operating power; operating power detection means for detecting whether or not the operating power is being supplied; and operation status information write means for selectively writing the operation status information into the non-volatile memory means depending on whether or not the operating power is being supplied.

As described above, in the first aspect, once the operating power is restored from a shutoff, the operation of the multi-source audio apparatus can be swiftly restarted from the state at the shutoff.

According to a second aspect based on the first aspect, the operation status information includes first data to be written into the non-volatile memory means when the operating power is being supplied to the multi-source audio apparatus and second data to be written into the non-volatile memory means when the operating power to the multi-source audio apparatus is shut off.

According to a third aspect based on the second aspect, while operating power is supplied, the operation status information write means writes the first data into the non-volatile memory means using the operating power, and when the operating power is shut off, the operation status information write means writes the second data into the non-volatile memory means using power stored in the power storage means.

As described above, in the third aspect, by storing units of the operation status information separately in the non-volatile memory according to the supply state of the operating power, it is possible to reduce the load of the recording of the operation status at a cutoff of supply of the operating power into the non-volatile memory.

According to a fourth aspect based on the third aspect, the operation status information write means writes any of the first data left unwritten to the non-volatile memory means at the time of a shutoff of the operating power into the non-volatile memory means together with the second data.

According to a fifth aspect based on the first aspect, the non-volatile memory means comprises: an operation status information storage region for storing the operation status information; and a program storage region for storing a program for correction processing executed in the event of an occurrence of a problem in preinstalled microcomputer software for controlling the multi-source audio apparatus.

According to a sixth aspect based on the first aspect, the first data is low in the frequency of change of its contents compared with the second data.

According to a seventh aspect based on the first aspect, the first data is large in size compared with the second data.

According to an eighth aspect based on the first aspect, the non-volatile memory means is an EEPROM.

According to a ninth aspect based on the first aspect, information on preset station selection set by a user is also written into the non-volatile memory means when the operating power is shut off during operation of the analog tuner.

Thus, according to the present invention, in the event of abrupt cutoff of power supply during operation, the multi-source audio apparatus can return to the status at the shutoff once power is restored.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows a memory map of an EEPROM in FIG. 1;

FIG. 3 is a view showing examples of items and their sizes of backup data Dbk written into the EEPROM in FIG. 1;

DESCRIPTION OF THE PREFERRED EMBODIMENTS

Figure 1:
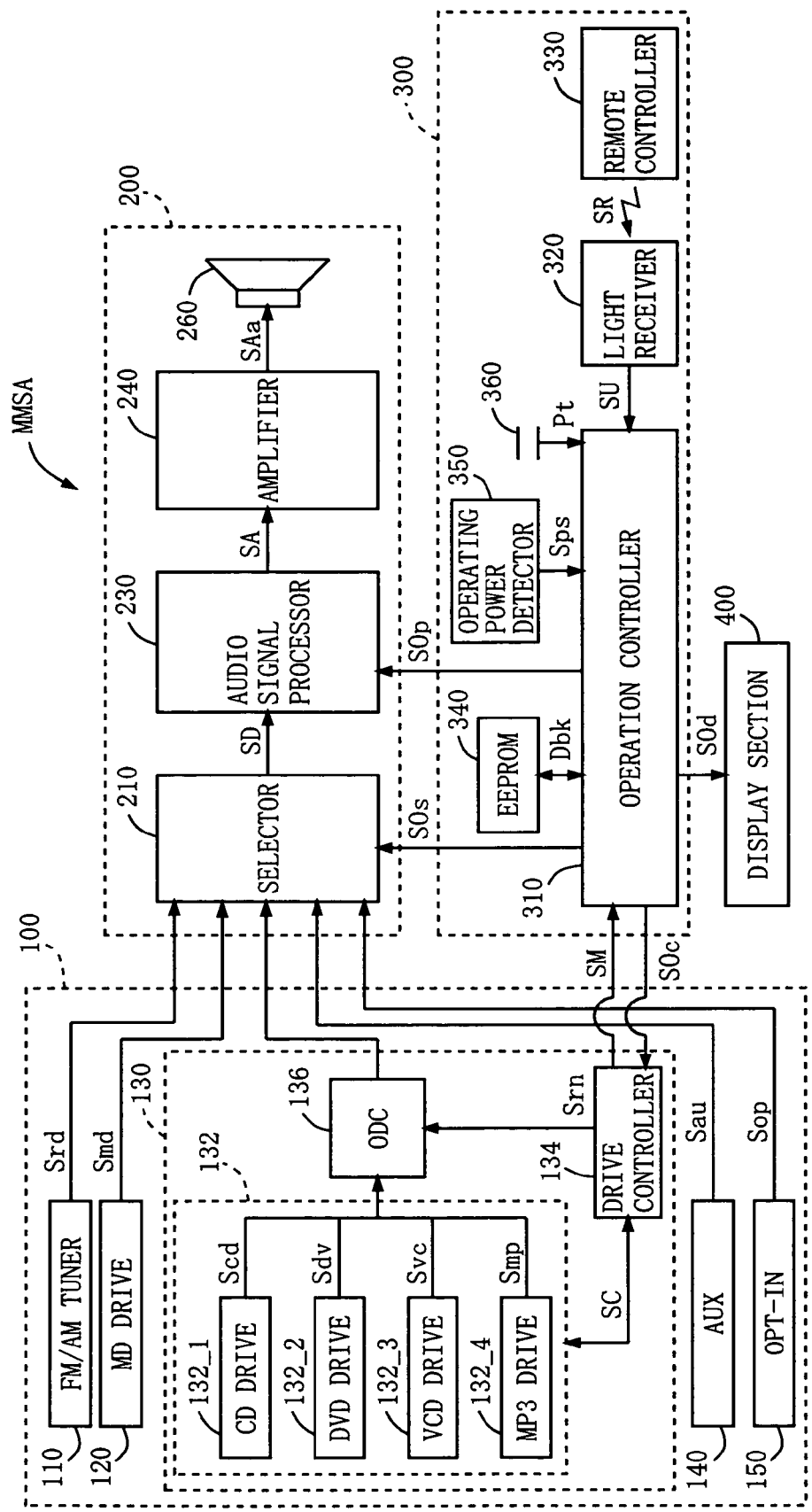
FIG. 1 is a block diagram of a multi-source audio apparatus incorporating a backup system of an embodiment of the present invention.

Hereinafter, a multi-source audio apparatus incorporating a backup system of an embodiment of the present invention will be described with reference to FIGS. 1 to 6. As shown in FIG. 1, a multi-source audio apparatus MMSA includes a multi-source section 100, an audio signal processing section 200, a control section 300 and a display section 400. The multi-source section 100, including a plurality of audio signal sources, retrieves audio signals from the respective audio signal sources separately and supplies the signals to the audio signal processing section 200. The audio signal processing section 200 executes various kinds of processing for the audio signals supplied from the multi-source section 100, and outputs the results as sound.

The display section 400, which is preferably composed of a light-emitting means such as a fluorescent display tube, presents information such as the operation mode of the multi-source audio apparatus MMSA to the user by means of light. The control section 300, connected to the multi-source section 100, the audio signal processing section 200 and the display section 400, controls the operation of the entire multi-source audio apparatus MMSA.

The multi-source section 100 includes an FM/AM tuner 110, an MD drive 120, a combination drive 130, an expansion input terminal 140 (shown as "AUX" in FIG. 1) and an optical input terminal 150. The FM/AM tuner 110 receives radio FM or AM broadcast, generates a broadcast audio signal Srd, and outputs the signal to the audio signal processing section 200. The MD drive 120 reproduces an audio signal recorded on an MD (R) and outputs the signal to the audio signal processing section 200 as an MD audio signal Smd. The auxiliary input terminal 140, connected to an external audio system, outputs an audio signal received from the audio system to the audio signal processing section 200 as an auxiliary audio signal Sau. The optical output terminal 150, connected to an external audio system having an optical output terminal, outputs an optical audio signal Sop received from the audio system to the audio signal processing section 200.

The combination drive 130 includes at least one optical disc drive 132, a drive controller 134 and an optical disc controller 136 (shown as "ODC" in FIG. 1). The optical disc drive 132 accepts any of various types of optical disc media, reads recorded data from the optical disc medium, and outputs the read data to the optical disc controller 136. The optical disc drive 132 is provided with a means for detecting the type of the optical disc mounted, and is to be viewed as different optical disc drives for different types of optical discs detected. Herein, therefore, for convenience of description, these optical disc drives as differently recognized are described as if they were individually separate drives. Specifically, the optical disc drive 132 is considered as including optical disc reproduction devices represented by a CD drive 132_1, a DVD drive 132_2, a VCD drive 132_3, an MP3 drive 132_4 and the like.

The CD drive 132_1 reads digital data such as music data and a computer program from a CD mounted and outputs the read data as CD data Scd. The DVD drive 132_2 reproduces MPEG data Sdv from a DVD and outputs the data. The VCD drive 132_3 reproduces an audio signal from a video CD and outputs the signal as a video CD audio signal Svc. The MP3 drive 132_4 reproduces audio data from an MP3 file recorded on an optical disc and outputs the data as an MP3 audio signal Smp. The drive controller 134, connected to the optical disc drive 132, exchanges a combination drive control signal SC with the optical disc drive 132, and while controlling the operation of the optical disc drive 132, detects the type of the optical disc mounted on the optical disc drive.

The drive controller 134 generates a rotational speed indicating signal Srn representing a rotational speed corresponding to a reproduction rate specified by a combination drive control signal SOc received from the control section 300, and outputs the generated signal to the optical disc controller 136.

The optical disc controller 136 correctly reads any of the reproduced signals including the PCM audio signal Scd, the audio data Sdv, the video CD audio signal Svc and the MP3 audio signal Smp described above, and outputs the read signal to the audio signal processing section 200. Hereinafter, the broadcast audio signal Srd output from the FM/AM tuner 110 to the audio signal processing section 200, the MD audio signal Smd, the PCM audio signal Scd, the audio data Sdv, the video CD audio signal Svc, the MP3 audio signal Smp, the auxiliary audio signal Sau and the optical audio signal Sop are collectively called multi-source reproduced signals.

The audio signal processing section 200 includes a selector 210, an audio signal processor 230, an amplifier 240 and a speaker 260. The control section 300 preferably includes an operation controller 310, a light receiver 320, a remote controller 330, an EEPROM 340, an operating power detector 350 and a capacitor 360 as a power storage means. The EEPROM 340, connected to the operation controller 310, is a non-volatile memory for storing operation status information of the multi-source audio apparatus MMSA, which is temporarily held in a working RAM of the operation controller 310, as backup data Dbk.

FIG. 2 shows a memory map of the EEPROM 340. Addresses 0×000 to 0×2FF (768 W×16 bits=1536 bytes) are used for storing the backup data Dbk. Addresses 0×300 to 0×3FF are used for storing EEPROM data for correction, for executing ROM correction (correction of software) in the event of an occurrence of a problem in the software of the operation controller 310.

Read of the backup data Dbk stored in the EEPROM 340 is executed only at a reset start of a microcomputer constituting the operation controller 310. After initialization of interrupt settings executed after a reset, the validity of the backup data Dbk stored in the EEPROM 340 is determined based on a check code and checksum data in the EEPROM 340.

Specifically, if a check code (0×A5) cannot be confirmed, it is determined that the backup data Dbk is not stored. This check with the check code is performed twice at maximum. When existence of the backup data Dbk is determined, the backup data stored in the EEPROM 340 at positions from the start of backup data to the end of backup data is loaded into a RAM region of the microcomputer of the operation controller 310 for temporary holding.

The checksum for the backup data held in the RAM region is compared with the checksum stored in the EEPROM 340. If they match each other, the backup data is determined as valid. The checksum comparison is performed twice at maximum. If they do not match each other, default data for under-operation sequential write type information (to be described later) is written into the EEPROM 340. This is in order to ensure that the backup data Dbk is always valid at a reset start of the microcomputer of the operation controller 310, following restart of supply of operating power.

Holding of the backup data Dbk will be briefly described. When the backup data Dbk read from the EEPROM 340 is determined as valid, the backup data Dbk temporarily held in the RAM region is loaded and held in a relevant work RAM region in the microcomputer. The backup data Dbk held in the work RAM region is then examined in smaller data units, to determine whether or not each data unit falls within a predetermined valid range.

If there is found no data unit falling outside the valid range, the backup data Dbk is determined as valid. The multi-source audio apparatus MMSA is then hot-started based on the backup data Dbk. If any data unit is found that falls outside the valid range, the backup data Dbk is determined as invalid. The relevant RAM region in the microcomputer is cleared, and the multi-source audio apparatus MMSA is cold-started.

The recording (write) of the backup data Dbk into the EEPROM 340 is conducted in the following manner. Since addresses 0×300 to 0×3FF are allocated as a data region for ROM correction, write of the backup data into addresses other than 0×000 to 0×2FF is prohibited. As much information as possible is written into the EEPROM 340 as the backup data Dbk while the operating power is being supplied to the multi-source audio apparatus MMSA. Once the operating power is shut off, the portion of the data left unwritten is written into the EEPROM 340 at the shutoff using backup power Pt stored in the capacitor 360. In this way, two-stage write of the backup data Dbk into the EEPROM 340 is accomplished.

To achieve the two-stage write described above, according to the present invention, the backup data Dbk is classified into two types, an under-operation sequential write type (hereinafter, referred to as "sequential backup data Dbk_A") and an under-power shutoff write type (hereinafter, referred to as "under-shutoff backup data Dbk_B"), and managed under this classification. This management is meaningful not only from the standpoint of reducing the time required for the backup processing during power shutoff and thus reducing the backup power Pt, but also from the standpoint of the life of the EEPROM 340. The life (number of times of write) of the EEPROM 340 is relatively short. When the number of times of write is limited to one hundred thousand, for example, and the use life of the multi-source audio apparatus MMSA is ten years, data should be written only about 27.4 times a day (100000 times/(10 years×365 days)).

For the reason described above, it is necessary to select, as the sequential backup data Dbk_A, data that does not change so much during the operation of the multi-source audio apparatus MMSA and has a relatively large volume. Examples of such data include user-set data such as CD program memory information, MD program memory information and tuner preset station-selection memory contents.

As the under-shutoff backup data Dbk_B, data that frequently changes such as the last function, the last received frequency and the last volume level is selected.

The sequential backup data Dbk_A is written into the EEPROM 340 not at all times but only when the apparatus is in a mute mode. If data is written/read into/from the EEPROM 340 when the tuner receives a broadcast, electromagnetic noise will arise and enter the tuner, resulting in output of noise from the speaker 260 and thus causing the user discomfort. By the above limitation, this problem can be prevented. Note that the following states are also included in the mute mode: when the multi-source section 100 is at a halt; when change of the reception frequency of the FM/AM tuner 110 is underway; when function switching is underway; and when power is off.

As described above, the sequential backup data Dbk_A is originally intended to be entirely written into the EEPROM 340 during the operation of the multi-source audio apparatus MMSA. However, some of the sequential backup data Dbk_A may fail to be written into the EEPROM 340 depending on the timing of the shutoff of the operating power. This portion of the sequential backup data Dbk_A left unwritten is written into the EEPROM 340 at the shutoff of the operating power, together with the under-shutoff backup data Dbk_B.

At shutoff of the operating power, the operating clock of the microcomputer is changed from high-speed fxx to fxx/8, to thereby reduce the operable lower-limit voltage of the microcomputer (from 5 V at high-speed operation to 3.5 V, for example). This permits reduction of the backup power Pt of the capacitor 360 used for the write of the under-shutoff backup data Dbk_B into the EEPROM 340, and also scale-down of the capacitor 360.

FIG. 3 shows an example of the backup data Dbk. The backup data Dbk includes the sequential backup data Dbk_A and the under-shut off backup data Dbk_B. The sequential backup data Dbk_A is desirably composed of block units small enough to be written into the EEPROM 340 even in the interval during which the FM/AM tuner 110 is changing its reception frequency. The under-shutoff backup data Dbk_B is desirably as small as less than about 50 bytes. The reasons are as follows. The maximum write time into the EEPROM 340 is normally about 10 msec. And, assuming that it takes about 15 msec to store operation of two bytes, a total of 375 msec is necessary for write of data of 50 bytes.

As is apparent from FIG. 3, all of the operation status information temporarily held in the RAM of the microcomputer of the operation controller 310 is not necessarily processed as the backup data Dbk. Such non-backup data Dbk_N includes the current clock count value, for example.

The current clock count value is information constantly changing every moment. If such a value is included in the sequential backup data Dbk_A, the data in the EEPROM 340 will be constantly rewritten, and this will significantly impair the life of the EEPROM 340.

The operating power detector 350 detects whether or not the operating power is being supplied to the multi-source audio apparatus MMSA, generates a power supply signal Sps indicating the detection result, and outputs the signal to the operation controller 310. The capacitor 360 as the power storage means stores the operating power supplied by a predetermined amount as the backup power Pt, so as to be used as driving power supply (backup power supply) for executing the backup processing in the event that supply of the operating power to the multi-source audio apparatus MMSA is cut off. The backup processing with the EEPROM 340, the operating power detector 350, the capacitor 360 and the operation controller 310 will be described in detail later.

The user can give an instruction to the multi-source audio apparatus MMSA by operating the remote controller 330. In other words, in response to the user's operation, the remote controller 330 emits a remote controller signal SR. Receiving the remote controller signal SR from the remote controller 330, the light receiver 320 outputs a user instruction signal SU reflecting the user's operating intention to the operation controller 310.

The operation controller 310 generates the combination drive control signal SOc for controlling the operation of the combination drive 130 based on the user instruction signal SU received from the light receiver 320, and outputs the signal to the drive controller 134. The drive controller 134 generates the control signal SC based on the combination drive control signal SOc for controlling the optical disc drive 132. The drive controller 134 also generates a combination drive status signal SM including medium identification information indicating the type of the optical disc currently mounted in the optical disc drive 132 and operation status information of the combination drive 130, and output the signal to the operation controller 310.

The operation controller 310 generates a selector control signal SOs for controlling the operation of the selector 210 and an audio signal processing control signal SOp for controlling the operation of the audio signal processor 230, and outputs the signals to the selector 210 and the audio signal processor 230, respectively. Specifically, the operation controller 310 determines which one is being used, the FM/AM tuner 110, the MD drive 120, the combination drive 130, the auxiliary input terminal 140 or the optical input terminal 150, based on the user instruction signal SU. In other words, the operation controller 310 determines which one should be selected among the multi-source reproduced signals input into the selector 210, that is, the broadcast audio signal Srd, the MD audio signal Smd, the auxiliary audio signal Sau, the optical audio signal Sop, and any of the PCM audio signal Scd, the MPEG data Sdv, the video CD audio signal Svc and the MP3 audio signal Smp read from the optical disc drive 132.

When a reproduced audio signal from the optical disc drive 132 is input into the selector 210, the operation controller 310 detects which one is being input from the optical drive 132, the PCM audio signal Scd, the MPEG data Sdv, the video CD audio signal Svc or the MP3 audio signal Smp, based on the combination drive status signal SM. The operation controller 310 generates the selector control signal SOs to connect an input port corresponding to the audio signal detected as being input to the output port of the selector 210, and outputs the signal to the selector 210. The selector 210 outputs the audio signal input at the input port designated by the selector control signal SOs to the audio signal processor 230 as audio data SD.

The operation controller 310 further generates the audio processing control signal SOp based on the user instruction signal SU, for subjecting the audio data SD output from the selector 210 to audio processing desired by the user, and outputs the signal to the audio signal processor 230. The audio signal processor 230 subjects the audio data SD input via the selector 210 to type-dependent processing based on the audio processing control signal SOp to thereby generate an analog audio signal SA, and outputs the signal to the amplifier 240.

The amplifier 240 amplifies the analog audio signal SA received from the audio signal processor 230 to generate a speaker drive signal SAa and outputs the signal to the speaker 260. The speaker 260 is driven with the speaker drive signal SAa to reproduce a sound wave such as music.

The operation controller 310 further generates an operation status display signal SOd indicating the operation status of the multi-source audio apparatus MMSA based on the user instruction signal SU and the combination drive status signal SM, and outputs the signal to the display section 400. The display section 400 presents the operation status of the multi-source audio apparatus MMSA to the user by means of light based on the operation status display signal SOd.

Figure 4:
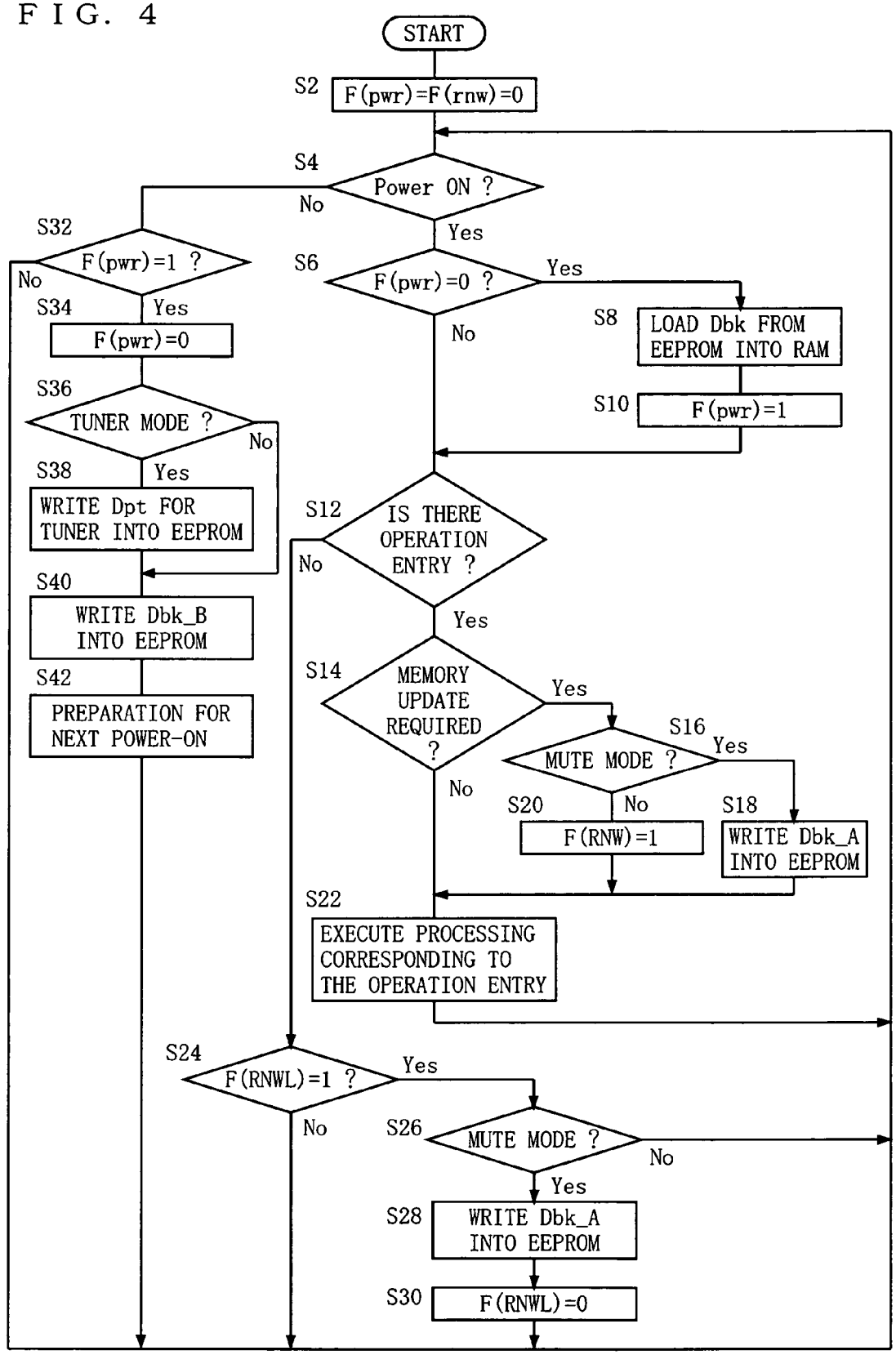
FIG. 4 is a flowchart showing backup operation of the multi-source audio apparatus of FIG. 1.

Hereinafter, referring to the flowchart of FIG. 4, the backup processing by the multi-audio apparatus MMSA will be described. The processing begins by turning power on, whereby operating power is supplied to the multi-source audio apparatus MMSA to allow the operation of the apparatus to be started.

First, in step S2, both a power ON flag F(pwr) and an update request flag F(rnw) are set at 0. The control then proceeds to next step S4. The power ON flag F(pwr) is 1 when operating power is being supplied to the multi-source audio apparatus MMSA, and 0 when power supply is cut off. The update flag F(rnw) is 1 when update of the backup data Dbk recorded in the EEPROM 340 is necessary, and 0 when no update is necessary.

At step S4, whether or not operating power is ON, that is, whether or not operating power is being supplied to the multi-source audio apparatus MMSA, is determined based on the power supply signal Sps. If YES, the control proceeds to step S6.

At step S6, whether or not the power ON flag F(pwr) is 0 is determined. If this determination is made immediately after the start of the multi-source audio apparatus MMSA, at which the power ON flag F(pwr) is set at 0 in step S2, the result is Yes, and the control proceeds to step S8.

At step S8, the backup data Dbk is loaded from the EEPROM 340 and is temporarily written into a RAM. The control then proceeds to step S10.

At step S10, the power ON flag F(pwr) is set at 1, and the control proceeds to step S12.

If the determination result of step S6 is NO, that is, if it is determined that the power ON flag F(pwr) is not 0, the control proceeds to step S12 skipping steps S8 and S10.

At step S12, whether or not there is any user's operation entry that may change the operation status of the multi-source audio apparatus MMSA is determined based on the user instruction signal SU. If YES, the control proceeds to step S14.

At step S14, whether or not the user's operation entry detected in step S12 relates to an operation involving memory update, that is, backup processing, is determined. If YES, the control proceeds to step S16.

At step S16, whether or not the multi-source audio apparatus MMSA (audio signal processing section 200) is in the mute mode (mute on), that is, whether or not no sound is output from the speaker 260, is determined based on the user instruction signal SU and the audio processing control signal SOp. If YES, the control proceeds to step S18.

At step S18, the backup data Dbk in the EEPROM 340 is rewritten, and the control proceeds to step S22.

If NO in step S16, that is, if it is determined that the apparatus is not in the mute mode, the control proceeds to step S20.

At step S20, the update request flag F(rnw) is set at 1. At this time, the amplifier 240 continues amplifying the analog audio signal SA, generating the speaker drive signal SAa and outputting the signal to the speaker 260 to reproduce sound. The control proceeds to step S22.

At step S22, processing responding to the user's operation entry detected based on the user instruction signal SU in step S12 is executed. The control then returns to step S4.

If NO in step S12, that is, if it is determined that there is no user's operation entry, the control proceeds to step S24.

At step S24, whether or not the update request flag F(rnw) is 1 is determined. If YES, the control proceeds to step S26.

At step S26, as in step S16, whether or not the apparatus in the mute mode is determined. If YES, the control proceeds to step S28. If NO, the control returns to step S4.

At step S28, as in step S18, the backup data Dbk in the EEPROM 340 is rewritten, and the control proceeds to step S30. In step S30, F(rnw) is cleared to 0, and the control returns to step S4.

If NO in step S24, that is, if it is determined that the update request flag F(rnw) is not 1, the control returns to step S4 skipping steps S26, S28 and S30.

At step S4, if NO, that is, if it is determined that the operating power supply is cut off, the control proceeds to step S32.

In step S32, whether or not the power ON flag F(pwr) is 1 is determined. If YES, the control proceeds to next step S34.

At step S34, the power ON flag F(pwr) is set at 0, and the process proceeds to next step S36.

At step S36, whether or not the apparatus is in the tuner mode is determined. If YES, the control proceeds to next step S38.

At step S38, data Dpt on tuner preset station selection is written into the EEPROM 340. The data Dpt on tuner preset station selection includes user's residence information. The control then proceeds to next step S40.

If NO in step S36, the control proceeds to step S40 skipping step S38.

At step S40, the portion Dbk_B of the remaining backup data Dbk other than the tuner preset data Dpt is written into the EEPROM 340. The control then proceeds to next step S42.

At step S42, preparation processing for coming restoration of the operating power shut off in step S4 is executed. The control then returns to step S4.

As described above, according to the present invention, at the time when the multi-source audio apparatus MMSA is first powered on, the EEPROM 340 stores invalid data or stores no data at all. Therefore, at power-on, data for initialization is set in the RAM without use of the backup data Dbk from the EEPROM 340. However, at the second and subsequent power-on operations at which power is again supplied to the multi-source audio apparatus MMSA after power supply is once cut off, the backup data Dbk is loaded into the RAM (steps S2, S4, S6 and S8).

If there is an operation entry (Yes in step S12) and an operation is done that may influence data to be backed up, that is, processing which requires memory update (Yes in step S14), the backup data Dbk stored in the EEPROM 340 is rewritten with data in the RAM (step S18) when the apparatus is in the mute mode (mute on). In the mute mode, no strange sound will come out of the speaker 260 and the like even if digital noise arises with the write into the EEPROM 340 and enters the tuner and the amplifier circuit.

Also, if there is an operation entry (Yes in step S12), the sequential backup data Dbk_A in the EEPROM 340 is rewritten only by a necessary amount for each actual operation (Yes in step S14, Yes in step S16 and step S18). In this way, by selectively writing data requiring sequential backup into the EEPROM 340, the amount of the under-shutoff backup data Dbk_B required to be written into the EEPROM 340 at shutoff of the operating power can be minimized. It takes nine seconds at maximum to write the backup data Dbk of which the total volume is about 1200 bytes. To write the under-shutoff backup data Dbk_B, which has about 50 bytes, only 375 msec at maximum or about 150 msec in practice is necessary. In view of this, the effect of the processing described above is great.

The tuner preset data Dpt for the FM/AM tuner 110 is part of the sequential backup data Dbk_A. However, since the tuner is in the reception state when preset operation is done and thus the mute mode is OFF (No in step S16), this data is left unwritten to the EEPROM 340. If the operating power is shut off immediately after this occurrence (No in step S4), this data is written into the EEPROM 340 at the shutoff, as is done for the under-shutoff backup data Dbk_B (step S38), to thereby prevent occurrence of data backup failure.

The tuner preset data Dpt has about 60 bytes, which is greater than the under-shutoff backup data Dbk_B. If the tuner preset data Dpt is included in the under-shutoff backup data Dbk_B so as to be written whenever the operating power is turned off, the under-shutoff backup data Dbk_B will amount to about 110 bytes (50+60). To write about 110 bytes, 825 msec at maximum or 400 msec in practice is required.

The capacitance of the capacitor 360 provided for voltage retention in the event of shutoff of the operating power greatly differs according to whether only about 150 msec is enough or about 400 msec is required as the write duration. It is assumed herein that the capacitance of the capacitor 360 for voltage retention is determined so as to provide a minimum duration of about 150 msec when the DVD drive 132_2 is used, for example.

The reason for the above decision is that there is an order-of-magnitude difference in current consumption between start/rotation of the DVD drive 132_2 and reception operation of the FM/AM tuner 110. In other words, under the condition that the capacitance of the capacitor 360 for voltage retention is the same, the voltage retention time of the capacitor 360 is completely different according to which portion of the multi-source section 100, the DVD drive 132_2 or the FM/AM tuner 110, is under use at the time of shutoff of the operating power.

Figure 5:
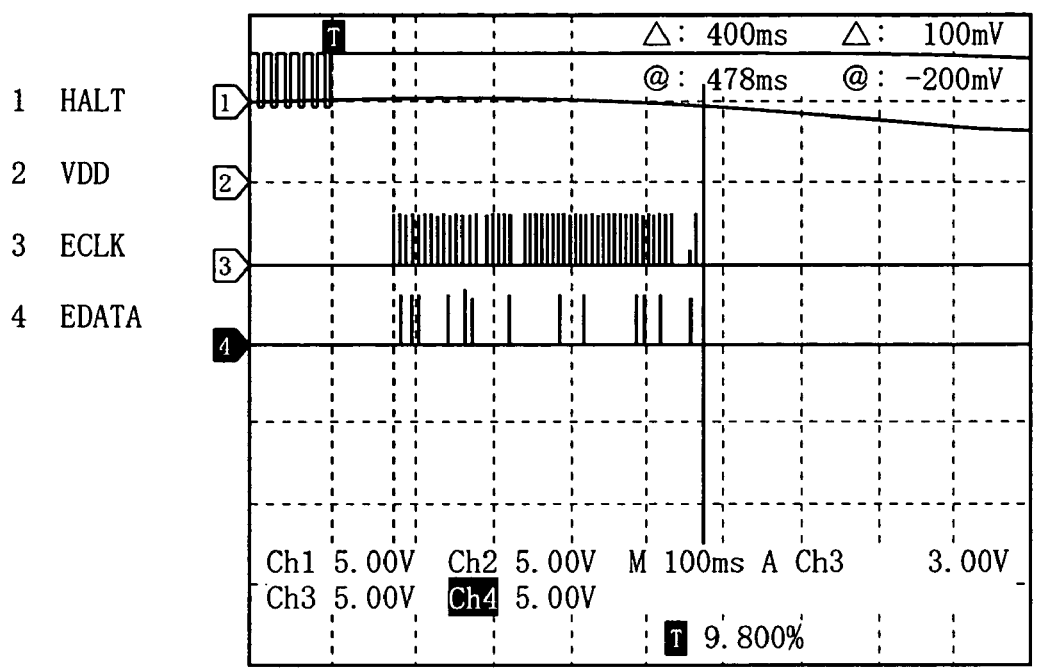
FIG. 5 is a view showing the results of an experiment conducted for determination of the capacitance of a capacitor required for backup during operation of an FM/AM tuner.
Figure 6:
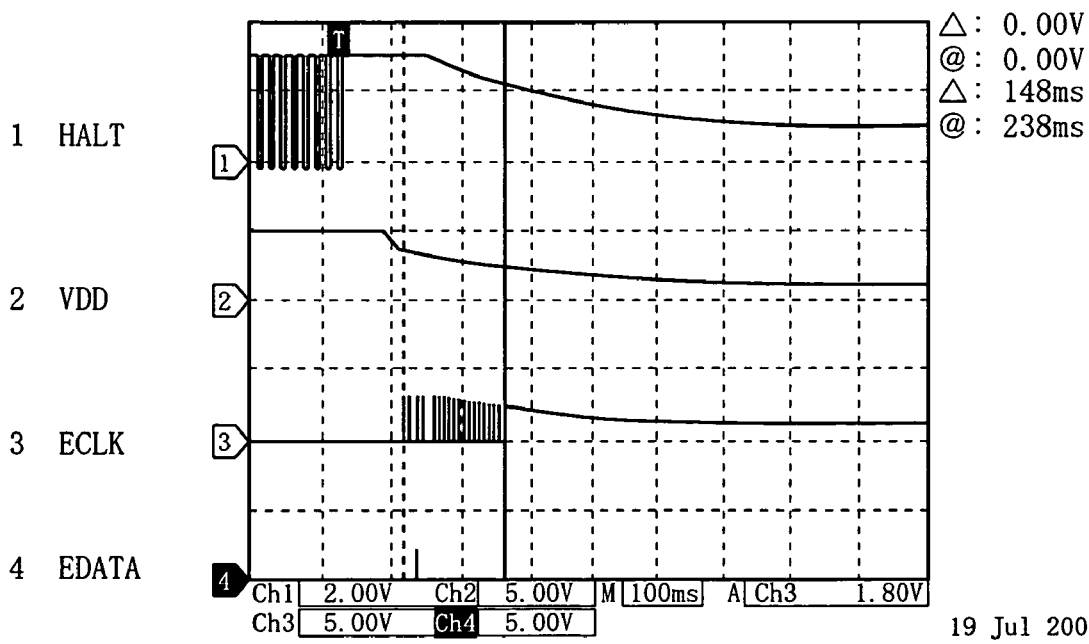
FIG. 6 is a view showing the results of an experiment conducted for determination of the capacitance of a capacitor required for backup during operation of a DVD drive.

FIG. 5 shows an example of the voltage retention time of the capacitor 360 observed when the operating power is turned off during use of the FM/AM tuner 110. FIG. 6 shows an example of the voltage retention time of the capacitor 360 observed when the operating power is turned off during use of the DVD drive 132_2. Although an AC operating power is used, the results will be basically the same when DC is used. The values shown are those obtained by experiments. Different values may naturally be obtained depending on the quality and performance of the components of the multi-source audio apparatus MMSA, but the trend is the same.

From FIG. 5, it can be seen that in the case that the operating power is turned off after operation of the tuner memory (76.5 MHz for all channels), the operating power is kept supplied for the time period during which HALT has a pulsing waveform fluctuating vertically. The time period during which ECLK has a pulsing waveform fluctuating vertically after the shutoff of the operating power corresponds to the write period of the EEPROM 340, which lasts about 400 msec. It is observed that at the time of the end of the time period during which ECLK has a pulsing waveform, decrease of the retention voltage VDD of the capacitor 360 is small.

From FIG. 6, it can be seen that in the case that the operating power is turned off during reproduction of a DVD with the DVD drive 132_2, also, the operating power is kept supplied for the time period during which HALT has a pulsing waveform fluctuating vertically. The time period during which ECLK has a pulsing waveform fluctuating vertically after the shutoff of the operating power corresponds to the write period of the EEPROM 340, which lasts about 150 msec. However, the retention voltage VDD of the capacitor 360 decreases so much before completion of the write into the EEPROM 340 that the write fails at the last moment. This indicates that so long as the retention voltage VDD of the capacitor 360 is retained for 150 msec or longer during use of the DVD drive 132_2, no problem will actually arise even if it takes about 400 msec to write data at shutoff during use of the tuner.

Accordingly, in the embodiment of the present invention, the capacitor 360 capable of retaining the voltage VDD for 150 msec or longer during use of the DVD 132_2 is adopted. The reason is as follows. According to the present invention, the tuner preset data Dpt is written into the EEPROM 340 at shutoff of the operating power source. Also, the backup data Dbk is classified into the under-shutoff backup data Dbk_B and the sequential backup data Dbk_A that is sequentially written in advance. By these measures, the time for which the retention voltage VDD of the capacitor 360 must be retained in the event of a blackout during start/rotation of the DVD drive 132_2 can be reduced from about 400 msec to about 150 msec.

It will take about nine seconds at maximum or about six seconds in practice if the entire backup data Dbk is written into the EEPROM 340 as the under-shutoff backup data Dbk_B. The present invention can shorten the six seconds by one-fortieth, that is, 150 msec.

As described above, according to the present invention, the capacitance of the capacitor 360 can be widely reduced, and this provides an advantage of reducing the cost of the multi-source audio apparatus MMSA.

While the invention has been described in detail, the foregoing description is in all aspects illustrative and not restrictive. It is understood that numerous other modifications and variations can be devised without departing from the scope of the invention.

What is claimed is:

1. A backup system, for use in a multi-source audio apparatus capable of selectively reproducing sound from audio signals received from a plurality of sound sources including an analog tuner according to a user's instruction, for holding operation status information of the multi-source audio apparatus when operating power is shut off, the backup system comprising:

control means for controlling operation of the multi-source audio apparatus;

operation status holding means for holding the operation status information of the multi-source audio apparatus;

non-volatile memory means for storing the operation status information;

power storage means for storing part of the operating power;

operating power detection means for detecting whether or not the operating power is being supplied; and operation status information write means for selectively writing the operation status information into the non-volatile memory means depending on whether or not the operating power is being supplied, wherein the operation status information includes first data to be written into the non-volatile memory means when the operating power is being supplied to the multi-source audio apparatus and second data to be written into the non-volatile memory means when the operating power to the multi-source audio apparatus is shut off.

2. The backup system according to claim 1, wherein, while operating power is supplied, the operation status information write means writes the first data into the non-volatile memory means using the operating power, and when the operating power is shut off, the operation status information write means writes the second data into the non-volatile memory means using power stored in the power storage means.

3. The backup system according to claim 2, wherein the operation status information write means writes any of the first data left unwritten to the non-volatile memory means at the time of shutoff of the operating power into the non-volatile memory means together with the second data.

4. The backup system according to claim 1, wherein the non-volatile memory means comprises:

an operation status information storage region for storing the operation status information; and a program storage region for storing a program for correction processing executed in the event of an occurrence of a problem in preinstalled microcomputer software for controlling the multi-source audio apparatus.

5. The backup system according to claim 1, wherein the first data is low in a frequency of change of its contents compared with the second data.

6. The backup system according to claim 1, wherein the first data is large in size compared with the second data.

7. The backup system according to claim 1, wherein the non-volatile memory means is an BEPROM.

8. The backup system according to claim 1, wherein information on preset station selection set by a user is written into the non-volatile memory means when the operating power is shut off during operation of the analog tuner.

* * * * *